US012642278B2

(12) United States Patent
Strong et al.

(10) Patent No.: US 12,642,278 B2
(45) Date of Patent: Jun. 2, 2026

(54) CONTINUOUS LOW TEMPERATURE PASTEURIZATION SYSTEM AND METHOD

(71) Applicant: JBT Marel Corporation, Chicago, IL (US)

(72) Inventors: John R. Strong, Bellevue, WA (US); Richard Daniel Stockard, Kirkland, WA (US); Jon A. Hocker, Bothell, WA (US)

(73) Assignee: JBT Marel Corporation, Chicago, IL (US)

( * ) Notice: Subject to any disclaimer, the term of this patent is extended or adjusted under 35 U.S.C. 154(b) by 171 days.

(21) Appl. No.: 14/322,854

(22) Filed: Jul. 2, 2014

(65) Prior Publication Data

US 2015/0010679 A1 Jan. 8, 2015

Related U.S. Application Data

(60) Provisional application No. 61/843,301, filed on Jul. 5, 2013.

(51) Int. Cl.
*A23B 4/005* (2006.01)
*A23B 2/22* (2025.01)
(Continued)

(52) U.S. Cl.
CPC ............. *A23B 4/0053* (2013.01); *A23B 2/22* (2025.01); *A23B 2/25* (2025.01); *A23L 5/13* (2016.08); *A23L 5/15* (2016.08)

(58) Field of Classification Search
CPC .................. A23B 4/0053; A23B 5/005; A23B 4/005–4/012; A23L 1/0121;
(Continued)

(56) References Cited

U.S. PATENT DOCUMENTS 2,352,590 A * 6/1944 Trinkle .................... A23B 4/16
99/476
3,076,713 A * 2/1963 Maas ..................... A23B 4/021
426/272
(Continued)

FOREIGN PATENT DOCUMENTS

CN 1283964 A 2/2001
CN 201821864 U 5/2011
(Continued)

OTHER PUBLICATIONS

Chinese Office Action with English Translation, and Search Report mailed Apr. 3, 2019, issued in corresponding Chinese Application No. 201480038068.7, filed Jul. 2, 2013, 30 pages.
(Continued)

*Primary Examiner* — Drew E Becker
(74) *Attorney, Agent, or Firm* — Christensen O'Connor Johnson Kindness PLLC

(57) ABSTRACT

A continuous low temperature food pasteurization system (10) includes a conveyor system (20) for conveying food products (FP) through a pasteurization chamber (40). A pre heater (140) may be located upstream from the pasteurization chamber, and an optional post heater (160) may be located downstream from the pasteurization chamber. A chiller and/or freezer (100) rapidly chills and/or freezes the food product after pasteurization as the conveyor system conveys the food product through the freezer. A control system (250) controls the operation of the pasteurization system to ensure that a desired percentage of pathogenic microorganisms present on the surface and/or within the interior of the food product are killed.

19 Claims, 4 Drawing Sheets

(51) Int. Cl.
    *A23B 2/25*         (2025.01)
    *A23L 5/10*         (2016.01)

(58) Field of Classification Search
    CPC ........ A23L 1/0128; A23L 1/317; A23L 3/001;
                A23L 3/003; A23L 3/04; A23L 3/06;
                A23L 3/18; A23L 3/3418; A23L 5/13;
                A23L 5/15; A23L 3/02–3/085; A23L
                3/16–3/205; A23V 2002/00; A61L
                                        2202/01
    See application file for complete search history.

(56)                 References Cited

U.S. PATENT DOCUMENTS

| | | | | |
|---|---|---|---|---|
| 3,201,264 | A * | 8/1965 | Rasmussen | A23B 4/052 |
| | | | | 426/233 |
| 3,607,312 | A * | 9/1971 | Ready | A23B 2/708 |
| | | | | 426/393 |
| 3,653,490 | A | 4/1972 | DePietro | |
| 3,663,233 | A * | 5/1972 | Keszler | A23L 13/77 |
| | | | | 426/281 |
| 3,814,889 | A * | 6/1974 | Stenstrom | A23L 3/045 |
| | | | | 219/731 |
| 3,961,090 | A * | 6/1976 | Weiner | A23L 13/00 |
| | | | | 426/523 |
| 3,966,980 | A * | 6/1976 | McGuckian | A23B 4/0053 |
| | | | | 426/393 |
| 3,973,047 | A * | 8/1976 | Linaberry | A23B 7/06 |
| | | | | 426/456 |
| 4,627,530 | A | 12/1986 | Franke | |
| 4,737,373 | A * | 4/1988 | Forney | A47J 37/044 |
| | | | | 426/510 |
| 5,008,123 | A * | 4/1991 | Bewley | A23B 4/0053 |
| | | | | 426/523 |
| 5,075,120 | A * | 12/1991 | Leary | A21B 1/48 |
| | | | | 426/523 |
| 5,077,065 | A * | 12/1991 | Ash | A23L 13/75 |
| | | | | 426/418 |
| 5,189,948 | A * | 3/1993 | Liebermann | A47J 27/18 |
| | | | | 134/131 |
| 5,243,962 | A | 9/1993 | Hwang | |
| 5,494,687 | A * | 2/1996 | Polster | A23L 17/40 |
| | | | | 426/418 |
| 5,552,172 | A * | 9/1996 | Liebermann | A23L 5/13 |
| | | | | 426/523 |
| 5,662,959 | A * | 9/1997 | Tippmann | A21B 3/04 |
| | | | | 426/510 |
| 5,976,601 | A * | 11/1999 | Tesvich | A22C 29/04 |
| | | | | 426/521 |
| 6,080,437 | A * | 6/2000 | Mauer | A23B 4/0056 |
| | | | | 426/106 |
| 6,142,065 | A * | 11/2000 | Panella | A23B 2/22 |
| | | | | 99/371 |
| 6,410,066 | B1 * | 6/2002 | Weng | A23L 3/003 |
| | | | | 426/231 |
| 6,528,101 | B1 * | 3/2003 | Polster | A23B 4/0053 |
| | | | | 426/300 |
| 6,743,454 | B1 * | 6/2004 | Gibson | A23B 4/01 |
| | | | | 426/243 |
| 7,285,299 | B1 * | 10/2007 | Howard | A23B 4/0056 |
| | | | | 426/129 |
| 7,374,035 | B2 | 5/2008 | Olsson | |
| 7,452,466 | B2 | 11/2008 | Binning | |
| 7,750,272 | B2 * | 7/2010 | Furlanetto | F24C 7/087 |
| | | | | 219/413 |
| 8,071,146 | B2 * | 12/2011 | Erasmus | A23B 5/01 |
| | | | | 426/243 |
| 9,095,638 | B2 * | 8/2015 | Solfa | A23B 2/22 |
| 2003/0049356 | A1 * | 3/2003 | Nielsen | A23C 3/033 |
| | | | | 426/522 |
| 2004/0033298 | A1 * | 2/2004 | Nelson | A23B 4/005 |
| | | | | 426/506 |
| 2004/0191374 | A1 * | 9/2004 | Weng | A23L 3/28 |
| | | | | 426/238 |
| 2005/0103213 | A1 * | 5/2005 | Dumm | A23C 3/031 |
| | | | | 99/483 |
| 2006/0040029 | A1 * | 2/2006 | Gunawardena | A23B 2/425 |
| | | | | 426/521 |
| 2008/0128403 | A1 * | 6/2008 | Jones | F24C 7/08 |
| | | | | 219/391 |
| 2010/0034935 | A1 * | 2/2010 | Wally | A47J 37/00 |
| | | | | 426/232 |
| 2011/0217439 | A1 * | 9/2011 | Morandotti | A23L 5/13 |
| | | | | 426/510 |
| 2015/0265090 | A1 * | 9/2015 | Pennella | A47J 27/04 |
| | | | | 426/232 |
| 2015/0354827 | A1 * | 12/2015 | Faraldi | A21B 3/04 |
| | | | | 426/510 |
| 2016/0220059 | A1 * | 8/2016 | Wachtler | A47J 27/10 |
| 2023/0363425 | A1 * | 11/2023 | Stockard | A23B 2/8033 |
| 2025/0081975 | A1 * | 3/2025 | Ganick | A23B 2/003 |

FOREIGN PATENT DOCUMENTS

| | | | | |
|---|---|---|---|---|
| EP | 1 797 758 A2 | 6/2007 | | |
| GB | 1038955 | 8/1966 | | |
| GB | 2 056 265 A | 3/1981 | | |
| WO | WO-9004928 A * | 5/1990 | | A23L 3/04 |
| WO | 92/13477 A1 | 8/1992 | | |
| WO | WO-9702751 A1 * | 1/1997 | | A23L 15/00 |

OTHER PUBLICATIONS

Second Office Action and Search Report mailed Oct. 28, 2019, issued in corresponding Chinese Patent Application No. 201480038068. 7, filed Jul. 2, 2014, 29 pages.

Communication mailed Nov. 8, 2019, issued in corresponding European Patent Application No. 14 744 698.3, filed Jul. 2, 2014, 8 pages.

Office Action mailed Jul. 1, 2020, issued in corresponding Chinese Patent Application No. 201480038068.7, filed Jul. 2, 2014, with partial English translation, 23 pages.

Office Action mailed Sep. 11, 2020, issued in corresponding Canadian Patent Application No. 2,913,406, filed Jul. 2, 2014, 6 pages.

International Search Report and Written Opinion mailed Oct. 30, 2014, issued in corresponding International Application No. PCT/US2014/045292, filed Jul. 2, 2014, 13 pages.

Sugiyama, M., et al., "Microflora in Sausages Pasteurized at Low Temperature and Their Sensory Evaluation," Nippon Shokuhin Kagaku Kogaku Kaishi 42(1):55-60, Jan. 1995 (with English abstract).

Brewer, M.S., "The Chemistry of Beef Flavor—Executive Summary," Prepared for the National Cattlemen's Beef Association, Centennial, Colo., Dec. 2006, 16 pages.

Decision of Rejection mailed Jan. 6, 2024, issued in corresponding Chinese Application No. 202110081902.2, filed Jul. 2, 2014, 18 pages.

First Office Action and Search Report mailed Apr. 24, 2023, issued in corresponding Chinese Application No. 202110081902.2, filed Jul. 2, 2014, 20 pages.

* cited by examiner

CONTINUOUS LOW TEMPERATURE PASTEURIZATION SYSTEM AND METHOD

CROSS-REFERENCE TO RELATED APPLICATION

This application claims the benefit of Provisional Patent Application No. 61/843,301, filed Jul. 5, 2013, the disclosure of which is hereby incorporated by reference herein in its entirety.

BACKGROUND

Typically food products for commercial distribution, such as meat, poultry and fish, are first cooked to a sufficient temperature (greater than 165° F. internal temperature) to kill off any pathogens that may be on the exterior or interior of the food product, such as E. coli. When the food product reaches 165° F. the bacteria is killed instantaneously. However, the large amount of heat that must be conducted through the surface to the interior of the food product to achieve the 165° F. internal temperature fully cooks the food product and results in the food product becoming relatively dry and tough when reheated for serving after commercial storage and distribution. This condition is due to juices in the food product being driven out, denaturing of proteins and the rendering of fats in the food product by the heat applied thereto.

In a vastly different approach to cooking food products, a method has been developed of cooking food in vacuum-sealed plastic pouches at relatively low temperatures for fairly long periods of time. This method is termed sous vide. Sous vide differs from conventional cooking methods in three fundamental ways: (1) the raw food is vacuum-sealed in a heat-sealable, food grade plastic pouch; and (2) the food is cooked using precise controlled heating, to limit and control the changes to the product, and (3) the killing of the bacteria is not instantaneous, but occurs over time at the lower temperatures. The vacuum packaging prevents evaporative losses of flavor volatiles and moisture during cooking and inhibits off-flavors from oxidation. The cooking for a long time at relatively low temperatures can provide a very tender product that is safe, but still not "fully cooked". This results in a specially flavorful and nutritious food. Vacuum sealing also allows for the efficient transfer and control of thermal energy from the water (or steam) to the food.

However, sous vide cooking can take relatively long lengths of time, and requires relatively expensive vacuum packaging. For example, cooking a beef patty via sous vide may take at least several hours, but at a temperature that does not provide an edibly pleasing appearance. Consequently, prior to serving the beef patty, it would be necessary to sear the exterior of the beef patty using a very hot heat source to provide the edibly pleasing appearance and flavor. As a consequence, the sous vide cooking method does not lend itself well to commercial application.

The precooking of food products is now well known on a commercial scale, including precooked meats, such as beef, pork, and chicken. In a large scale precooking process, meat may be coated with a liquid marinade and perhaps then a dry mix and then the coated meat cooked at a temperature of at least 200° F., and perhaps up to over 300° F. until the internal temperature of the meat indicates that it is high enough to instantly kill off pathogens therein. Such precooking of food, including meat, suffers from the same drawbacks as the normal cooking of meat, the driving off of juices and rendered fat from the meat, leaving the meat in dry, tough condition. Consequently, a need exists for a commercial system and method for sufficiently precooking/pasteurizing meat to eliminate pathogens, but still provide the benefits of a sous vide-type process. The present disclosure seeks to address this problem.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for continuously pasteurizing food products at a low maximum temperature over a sufficient time duration to kill pathogens on and/or in the food product comprises: a conveyance system for continuously conveying the food product to be pasteurized; a low temperature pasteurization chamber through which the conveyance system passes; a pasteurization medium generator in fluid flow communication with the pasteurization chamber, with the pasteurization medium generator providing heated air for heating the interior of the pasteurization chamber and/or supplying moisture to the interior of the pasteurization chamber. The pasteurizing system also includes a measurement system for measuring the operational parameters of the pasteurizing system, including the speed of the conveyor as well as the temperature and humidity within the low temperature pasteurization chamber. In addition, a control system is provided for monitoring the operational parameters of the pasteurization system, to determine if the conveyor is operating at a speed within a set point range that provides sufficient dwell time of the food product within the pasteurization chamber to kill a desired percentage of the pathogenic organisms present on and/or in the food product. The control system also monitors either the temperature of the heated air supplied to the pasteurization chamber to verify a set point range of about 131° F. to 158° F., or the food product temperature to determine if the interior of the food product attains a set point temperature of from 125.6° F. to 158° F. for a sufficient length of time to reach a desired level of lethality of pathogens on and/or in the food product. A third set point parameter monitored by the control system is whether the moisture within the pasteurization chamber is in the range of about 80 to 100 percent humidity. The control system is operational so that if the measured temperature and/or humidity deviates sufficiently from the preset set point temperature and/or humidity ranges, or if the speed of the conveyor deviates sufficiently from the preselected set point speed so that the desired percentage of pathogenic microorganisms are not killed, the control system initiates a rectifying procedure including altering one or more of the operational parameters so that the desired level of pathogenic microorganisms are killed.

In a further aspect of the present disclosure, the rectifying procedure initiated by the control system comprises issuing a notification of the deviation of the operational parameters. The initiation of the rectifying procedure can also provide a recommendation to the system operator as to the need to change the setting of one or more of the operational parameters to achieve the desired kill level of the pathogenic microorganisms on and/or in the food product.

In accordance with the present disclosure, the rectifying procedure carried out by the control system may include automatically altering one or more of the operational parameters, which parameters include the temperature in the pasteurization chamber, the moisture level within the pasteurization chamber, the conveyance system speed, the loading level of food products on the conveyance system, and diverting food products from the conveyance system.

In accordance with a further aspect of the present disclosure, the conveyance system includes a conveyor belt disposed in stacked, nearly horizontal layers within the pasteurization chamber. The food product enters the pasteurization chamber on the conveyor belt at the bottom of the stacked layers and exits the pasteurization chamber on the conveyor belt at the top of the stacked layers.

In accordance with a further aspect of the present disclosure, the low temperature pasteurization system also includes a circulation system for circulating the pasteurization medium through the low temperature pasteurization chamber. The control system is operable to control the circulation system so that the flow of the circulating medium within the pasteurization chamber is in the direction primarily generally horizontal and/or downwardly over the food product.

In accordance with a further aspect of the present disclosure, a pre-heater is positioned upstream relative to the low temperature pasteurization chamber. The pre-heater is operable to preheat the food product prior to entering the pasteurization chamber.

In accordance with a further aspect of the present disclosure, a collection system collects the rendered juices from the food product within the low temperature pasteurization chamber. A circulation system may direct the rendered juices onto the food product being conveyed on the conveyance system, or the rendered juices may be transported from the pasteurization chamber for storage or other uses.

In accordance with a further aspect of the present disclosure, the continuous low temperature pasteurization system also includes a chiller or freezer located downstream from the pasteurization chamber to rapidly cool and/or freeze the pasteurized food exiting the low temperature pasteurization chamber.

In accordance with a further aspect of the present disclosure, a post-pasteurization heating system is used to apply an intense level of heat to the surface of the food product after exiting the low temperature pasteurization chamber and before entering the chiller and/or freezer.

The present disclosure also provides a method for continuously pasteurizing food products at a low maximum temperature over a sufficient time duration to kill a desired percentage of the pathogens located on and/or in the food products. The method includes providing a pasteurization zone at a first operational parameter comprising the temperature of the pasteurization zone having a temperature set point of between 131° F. and 158° F. The method also includes conveying the food product loaded on a conveyor through the pasteurization zone at a second operational parameter comprising the speed of the conveyor so that the food product in the pasteurization zone reaches a set point temperature for a sufficient length of time to kill a desired percentage of pathogenic microorganisms that may be present on and/or in the food product. The method also includes measuring the temperature level within the pasteurization zone and/or the temperature of the food product. If the temperature within the pasteurization zone and/or temperature of the food product deviate sufficiently from the set point temperature range so that a desired percentage of pathogens on and/or in the food products is not killed, a rectifying procedure is initiated so that the desired level of pathogenic microorganisms are killed. The method further includes chilling or freezing the food product after the food product has been conveyed through the pasteurization zone.

In accordance with the present disclosure, the temperature set point can be the wet bulb temperature, the dry bulb temperature or the dew point temperature.

In accordance with the present disclosure, the step of initiating the rectifying procedure may include providing a notice of the temperature deviation within the pasteurization zone from the set point temperature. In addition, a recommended temperature at which to set the pasteurization zone can be provided.

In accordance with a further aspect of the present disclosure, the step of initiating a rectifying procedure can include automatically altering at least one operational parameter. Such operational parameters may include altering the temperature of the pasteurization zone, the speed of the conveyor, the food product loading level on the conveyor, and/or diverting the food product from the conveyor prior to the chilling or freezing step.

The method of the present disclosure may also include providing moisture within the pasteurization zone, measuring the moisture level within the pasteurization zone, and adjusting the moisture level within the pasteurization zone if the moisture level varies from a preset amount.

In accordance with a further aspect of the present method, the food product may be preheated prior to entering the pasteurization zone.

In accordance with a further aspect of the present method, the liquid rendered from the food products within the pasteurization zone may be collected. Such collected liquid may be applied to the food product within the pasteurization zone to assist in pasteurization of the food product. Alternatively, the collected liquid may be transported to a different location for storage or other utilization.

In accordance with a further aspect of the present disclosure, heated liquid may be supplied to the pasteurization zone and distributed over the food product to assist in heating and/or maintaining the temperature of the food product within the pasteurization zone.

The present disclosure also provides a system for continuously pasteurizing food products at a low maximum temperature over a sufficient time duration to kill pathogens on and/or in the food product. The system includes: a conveyance system for conveying the food product to be pasteurized; a low temperature pasteurization chamber through which the conveyance system passes; a pasteurization medium generator in fluid flow communication with the pasteurization chamber, the generator providing a pasteurization medium for heating and/or maintaining at a desired temperature the food product in the low temperature pasteurization chamber; and, a measurement system for measuring the operational parameters of the system, including the speed of the conveyor, the temperature within the pasteurization chamber, and/or the temperature of the pasteurization medium, and/or the temperature of the food product. The pasteurization system also includes a control system for monitoring the operational parameters of the pasteurization system, including the parameters of: (1) the speed of the conveyor within the pasteurization chamber to determine if the conveyor is operating at a speed within a set point range that provides the food product the needed dwell time within the pasteurization chamber to kill a desired percentage of the pathogenic microorganisms present on and/or in the food product; (2) the temperature of a pasteurization medium supplied to the pasteurization chamber and/or the temperature within the pasteurization chamber to determine if such temperature(s) are maintained at a temperature set point range of about 131° F. to about 158° F. and/or the temperature of the food product to determine if the temperature of the food product reaches the set point temperature for the food product. The control system is operational to predict changes in the temperature of the food product over time and/or to model the lethality of pathogenic microorganisms, and based on such prediction and/or modeling, if needed, initiate a rectifying procedure. The rectifying procedure includes altering one or more of the operational parameters so that the desired level of pathogenic microorganisms on and/or in the food product are killed while maintaining a desired temperature of product quality by keeping the core of the food product below the low maximum pasteurizing temperature.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

In the present application and claims, references to food products are meant to include all manner of food products that are commonly cooked. Such food products may include meat, fish, poultry, pasta, bread dough, pizza dough, or other types of dough or other types of foods.

The present application and claims relate to killing or eliminating pathogenic microorganisms that may be present on and/or in food products. The application also describes the killing of "bacteria" in and/or on food products. Such references to bacteria and pathogenic microorganisms relate to food pathogens, including, among others, the following: *E. coli, Salmonella* spp., *Clostridium botulinum, Staphylococcus aureus, Campylobacter jejuni, Yersinia enterocolitica* and *Yersinia pseudotuberculosis, Listeria monocytogenes, Vibrio cholerae* O1, *Vibrio cholerae* non-O1, *Vibrio parahaemolyticus* and other vibrios, *Vibrio vulnificus, Clostridium perfringens, Bacillus cereus, Aeromonas hydrophile* and other spp., *Plesiomonas shigelloides, Shigella* spp., miscellaneous enterics, and *Streptococcus.*

Figure 1:
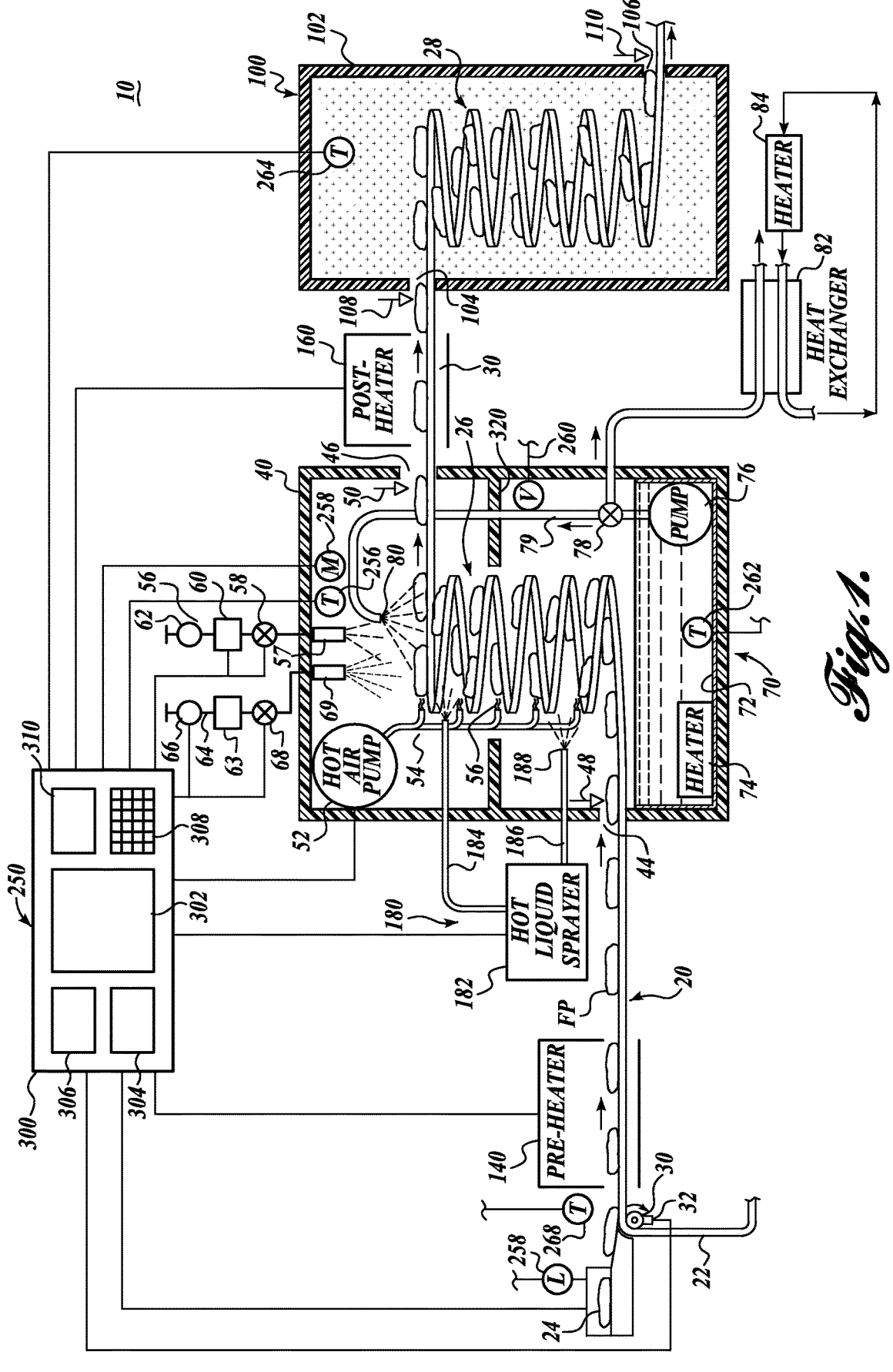
FIG. 1 is a schematic view of the pasteurization system of the present disclosure.

FIG. 1 schematically illustrates one embodiment of a continuous, low temperature food pasteurization system 10 of the present disclosure. The major systems/components of the pasteurization system 10 include a conveyor system 20 for conveying food products FP through the pasteurization system 10, including through a pasteurization chamber 40. A system 70 is provided for collecting the liquid or juices rendered from the food product and either using such collected juices to augment the pasteurization process or for other uses. The system 10 also includes a chiller and/or freezer 100 to rapidly chill and/or freeze the food product after pasteurization as the conveyor system carries the food product through the freezer.

Figure 3:
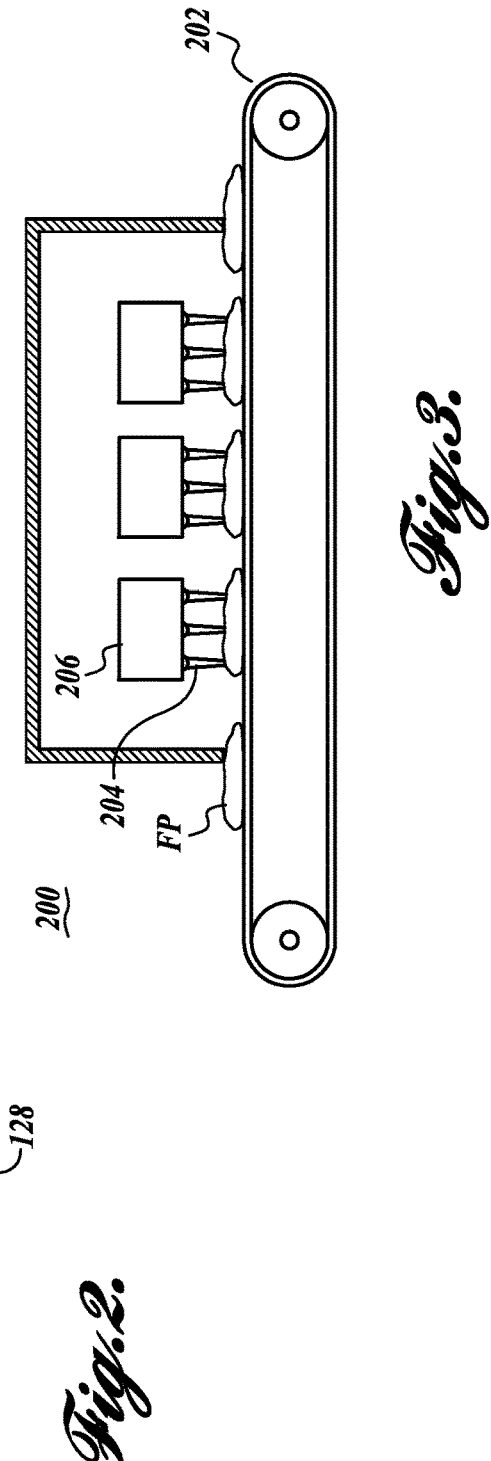
FIG. 3 is a marinator optionally utilized with the pasteurization system 10.
Figure 5:
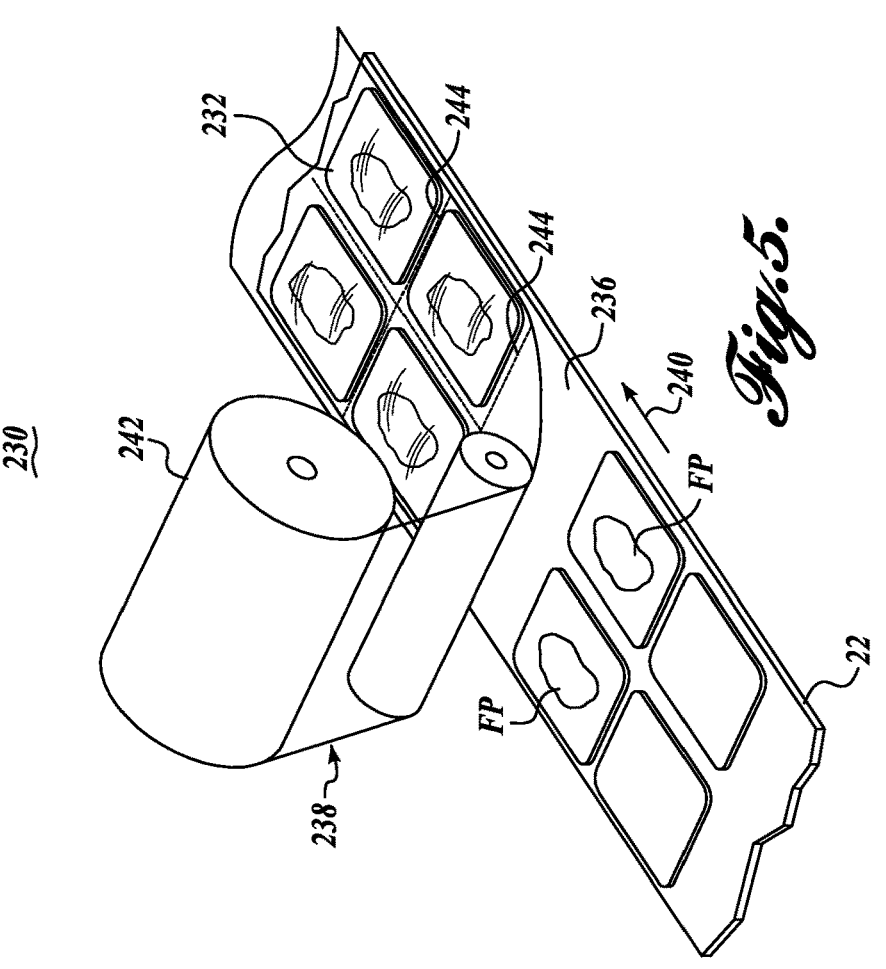
FIG. 5 illustrates optional packaging of the food product prior to pasteurization.

There are several optional systems, components or procedures that may be utilized in conjunction with the pasteurization system 10, including a pre-heater 140 located upstream of the pasteurization chamber 40, an optional post-heater 160 located downstream of the pasteurization chamber 40. In addition, an optional hot liquid spray system 180 may be utilized to augment the pasteurization of the food product within the chamber 40. As shown in FIG. 3, an optional marinating system 200 may be provided to marinate the food product prior to pasteurization. Further, as shown in FIG. 5, the food product FP may be packaged at a packaging station 230 prior to being processed by the pasteurization system 10.

Further, a control system 250 is employed to control the operation of the pasteurization system 10 to help insure that the system 10 operates to kill a desired percentage of any pathogenic microorganisms which may be present on the surface and/or in the interior of food product FP. The control system 250 receives input from various measurement devices or instruments of a measuring system 252 that measures/monitors, among other parameters, the temperature and moisture content within the pasteurization chamber 40, the temperature of the food product, the speed of the conveyor system 20, and the level of loading of food products on the conveyor system 20, as discussed more fully below.

Describing the pasteurization system 10 in greater detail, the conveyor system 20 includes a conveyor belt 22 for carrying the food product FP through the pasteurization system 10. The conveyor belt 22 receives food product FP from a delivery or loading conveyor 24 and then transports the food product into the pasteurization chamber 40, and then in one embodiment of the present disclosure, along an ascending spiral path within the chamber 40 to form a belt stack 26. This path enables the food product to be pasteurized in the chamber 40 within a relatively compact envelope. The conveyor belt 22 carries the processed food product FP from the pasteurization chamber 40 to a chiller or freezer 100. Within the freezer 100, the conveyor belt 22 assumes a descending spiral path in the form of a belt stack 28, again so that the food product is able to remain within the freezer 100 for a sufficient length of time to freeze the food product prior to transporting the food product for shipment, storage, or otherwise, while being within a relatively compact envelope. An intermediate run 30 of the conveyor belt 22 extends between the belt stacks 26 and 28.

In order to perform the function of the conveyor system 20 in a satisfactory manner, it is desirable that conveyor belt 22 be of an open or pervious configuration, such as composed of stainless steel wire mesh, thereby to provide adequate exposure to the underside of the food product. Such conveyor belts are articles of commerce.

The conveyor belt 22 is driven by an appropriate motor system, such as motor 31. The speed of the motor 31 and, thus, the belt 22 may be monitored by an encoder 32 associated with the motor and/or belt. A data signal from the encoder 32 is routed to control system 250. The operation in the control system is discussed more fully below.

Although the conveyor belt 22 can be of numerous constructions, in one form, the belt can be adapted to be self-supporting to form the belt stacks 26 and 28. Such self-supporting belts are known in the art, for example, as shown in U.S. Pat. No. 7,374,035, the disclosure of which is incorporated herein by reference.

Referring primarily to FIG. 1, the pasteurization chamber 40 includes an insulated housing 42 that can be of various constructions and shapes, for example, the housing 42 can be generally rectilinear or generally cylindrical in shape to accommodate the belt stack 26 and the other components of system 10 located within the housing. The housing includes an inlet 44 located at the lower portion thereof through which the conveyor belt 22 enters the housing, and an outlet 46 in the upper portion of the housing through which the conveyor belt 22 exits the housing. Appropriate sealing mechanisms can be utilized to retain the housing 42 sealed from the exterior. Such sealing mechanisms may include, for example, an air knife 48 adjacent housing inlet 44, as well as a second air knife 50 adjacent housing outlet 46. Of course, other types of sealing mechanisms may be utilized, for example, a curtain of flexible strips, constructed of a film material such as plastic, that hangs downwardly over the inlet 44 and outlet 46, and that are sufficiently flexible to conform to the shapes of the food products FP being carried by the conveyor. Of course, the plastic strip curtain construction may require periodic cleaning to help ensure that undesirable microorganisms do not lodge on the plastic or fabric hanging strips.

As noted above, belt stack 26 is located within the interior of housing 42, with the conveyor traveling in a helical path entering the bottom of housing 42 through entrance 44 and then exiting the upper portion of the housing 42 through outlet 46. Although one belt stack 26 is shown as positioned within the housing 42, the housing can be adapted to contain a plurality of belt stacks. Moreover, the conveyor belt 22 may be disposed in a different arrangement other than the helical belt stack 26 shown in FIG. 1. For example, an elevating chain conveyor may be employed as disclosed in U.S. Pat. Nos. 3,653,490, 4,627,530, and GB Patent No. 1038955, all incorporated herein by reference.

Pasteurization medium is supplied to the pasteurization chamber 40 to pasteurize the food product FP under specific conditions that are sufficient to kill pathogens, such as *E. coli* on and/or in the food product but without fully cooking the food product. In this manner, the food product is actually sufficiently cooked to be ready to eat, regardless of the extent of subsequent final cooking that occurs at a restaurant, home, or other location. In this regard, the pasteurization medium is supplied to the pasteurization chamber 40 so that the temperature within the pasteurization chamber is in a range of 131° F. to 158° F. and preferably at about 138° F. which is above the temperature needed to kill bacteria, typically 125.6° F. At this temperature, pasteurization of the food product can be completed within about 55 minutes, ideally under relatively high humidity conditions.

In addition to achieving a desired lethality of food pathogens, another factor in the temperature of the pasteurization medium is a desire to use a sous vide approach to cooking the food product. In this regard, the food product is retained below a temperature that would adversely affect the quality of the food product. As such, there is a desirable upper limit to the temperature that the food product should reach; e.g. not beyond the temperature that renders certain fats. For example, for beef, pork and lamb, this temperature is about 151° F., for fish this temperature is about 140° F., and for chicken and turkey this temperature is about 149° F., and for cooking eggs this temperature is about 153° F.

The pasteurization medium of the present disclosure can be composed of several components, including hot air, moisture, as well as either hot water or other liquid and/or heated rendered liquid collected from the food product being pasteurized. These components of the pasteurization medium are discussed below.

Figure 4:
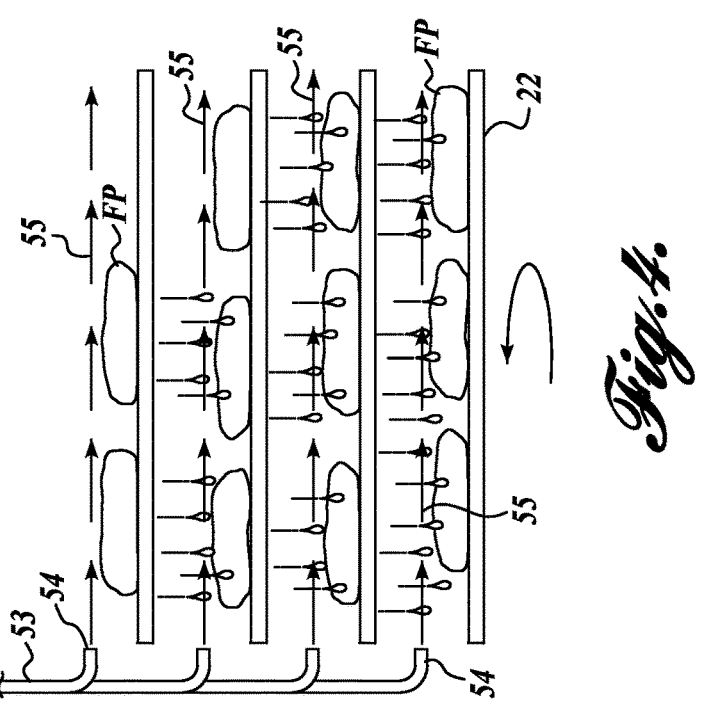
FIG. 4 schematically illustrates the flow of hot air and optionally liquid over food products during the pasteurization thereof.
Figure 6:
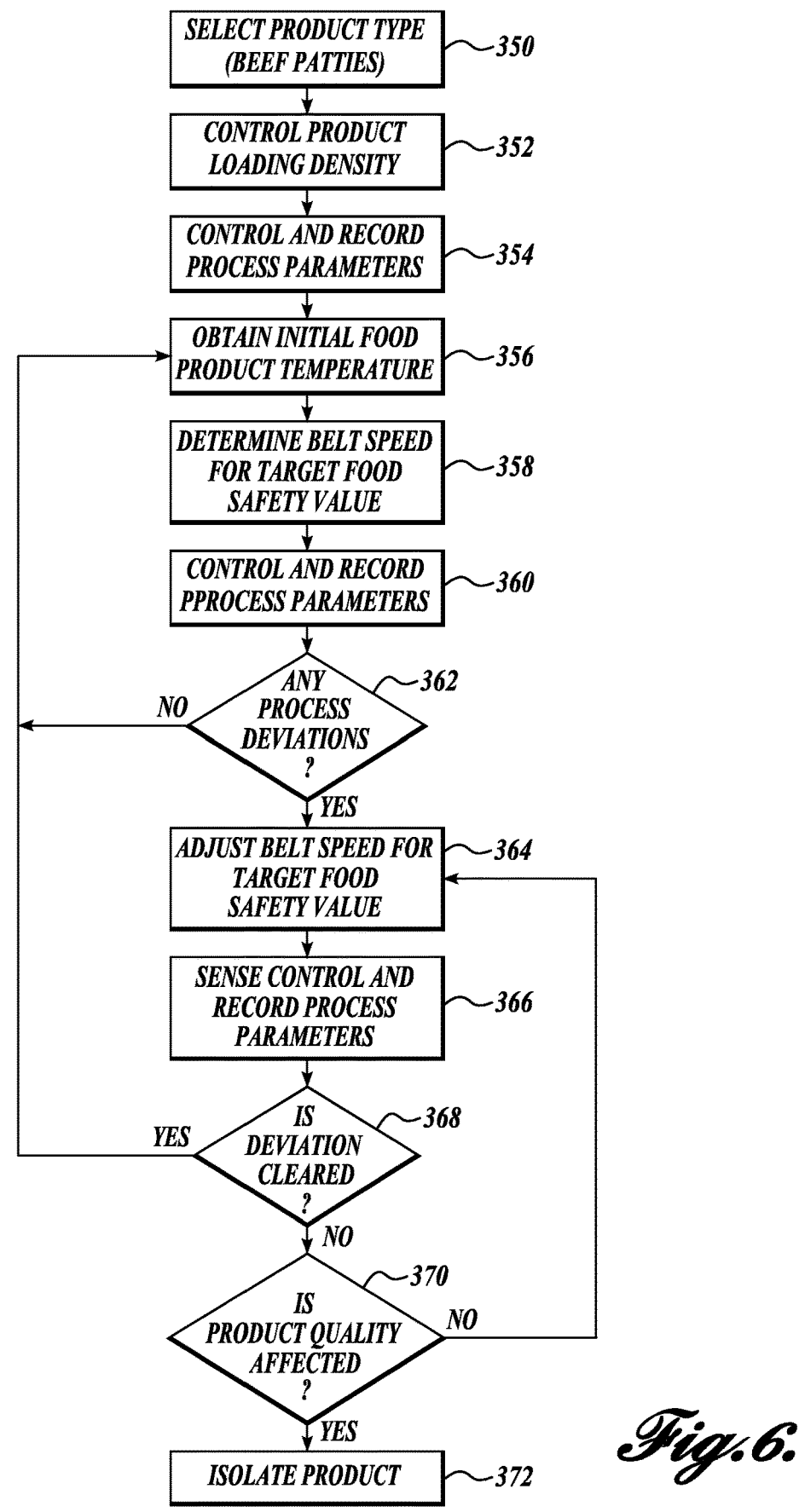
FIG. 6 illustrates a flow diagram of a method for operating a pasteurization system of the present disclosure.

One component of the pasteurization medium consists of heated air that is delivered to and circulated through the pasteurization chamber 40 via hot air pump or blower 52. The air supplied by the blower 52 can be heated in numerous ways, for instance, using electric, gas-fired air heaters, or by heating the air with a heat exchanger using steam or other heating medium. The system for heating the air can be integrated into the construction of the blower 52, or can be separate from the blower 52. A commercially available combined blower and gas heater assembly that may be used in the present invention is the Tube-O-Thermo gas burner from Maxon Corporation of Muncie, Ind. The air from the blower 52 is distributed within the housing 42 via manifold 53 which includes a plurality of discharge openings or nozzles 54 that are positioned to discharge the hot air in a generally horizontal and/or downward direction over the food product, see arrows 55 in FIG. 4 that symbolize this horizontal air flow. The heated air may flow across the pasteurization chamber at a rate of about 50 to 650 feet per minute. Thus, it is desirable that the heated air not blow over the food product in the upward direction to avoid carrying moisture rendered from food products located relatively low on the conveyor stack 26 in the upward direction, because such food products at that elevation of the conveyor stack may not be heated sufficiently to have killed the pathogens on and/or in such food products. However, in a pasteurization chamber it is necessary for the circulating air during its "return" path to flow in the upward direction. To this end, it is desirable that the heated air not flow in the upward direction within the housing 42 at a speed greater than about 400 feet per minute. Restricting the upward return flow of heated air below this speed likely will not cause unpasteurized moisture from rising upwardly through the housing 42.

The heat transfer mechanism from the hot air to the food product is via convection if the temperature of the food is greater than or equal to the dew point of the atmosphere. As discussed below, if the food entering the pasteurization chamber is cooler than the dew point of the atmosphere and the air is humid, the heating of the food product may include other modes of heat transmission, such as use of latent heat of the moist air. To this end, a relatively large flow of air may be required. Moreover, the air discharged by the openings or nozzles 54 will be at a temperature that is the same or perhaps just slightly higher than the desired temperature within the housing 42, due to heat absorption by the food product as well as heat loss from the housing 42.

Rather than utilizing a system that heats the air supplied by blower 52, a heat exchanger or a radiator can be utilized within the pasteurization chamber 40. Such heat exchanger could be composed of a number of pipes or tubes which may be finned, and one or more heaters to heat the surface of the heat exchanger. The heater can be composed of any suitable device that is capable of generating a desired level of heat within the tubes/pipes. For example, a suitable heater may be composed of an indirect gas-fired heater. The heat exchanger tubes can be positioned as desired in the housing 42, for example, either upstream or downstream from blower 52. In this manner, the blower 52 primarily functions to circulate air through the housing 42 with the temperature of such air controlled by the amount of heat generated by the heat exchanger.

A further component of the pasteurization medium within pasteurization chamber 40 consists of the level of moisture within the heating chamber. Desirably, the pasteurization chamber will be at a high humidity level. This serves various functions, including reducing moisture loss from the food product as it is being pasteurized. As food is heated, the temperature increase within the interior of the food necessarily drives moisture from the food. The moisture in the heated pasteurization chamber 40 serves to restrict or reduce the pathway of the moisture leaving the food product being pasteurized.

Moreover, the moisture level within the pasteurization chamber can be such that at least the initial temperature of the surface of the food products entering the pasteurization chamber will be lower than the dew point temperature of the moist, hot air in the pasteurization chamber. This will cause the steam in the air to condense on the surface of the food products with the resulting heat of condensation being transmitted to the surface of the food product. By maintaining a sufficiently high temperature and humidity of the air within the pasteurization chamber, the heat of condensation can be used to help heat the food product sufficiently to achieve a desired kill rate for the pathogenic microorganisms or other contaminants that may be present on and/or in the food products.

Humidity also reduces surface evaporation and the heat that evaporation removes from the food product during heating. If a sufficiently high relative humidity surrounding the food product is not maintained during heating, undesired evaporation cooling at the surface of the food product can occur.

It will be appreciated that for a given desired "kill" rate or log cycle reduction in pathogenic microorganisms, the required air temperature and humidity within the pasteurization chamber can be determined empirically for a number of different air velocities within the pasteurization chamber as well as for different conveyor belt speeds. The conveyor belt speeds are related to the dwell time of the food product within the pasteurization chamber. In this regard, applicants have established that for a pasteurization chamber temperature of 131° F. to 158° F., it is desirable to have a humidity level within the pasteurization chamber between about 80% and 100% relative humidity. In this regard, a temperature corresponding to a wet bulb temperature of 130° F. to 158° F. will meet this requirement. Also, at these high relative humidity levels, the dew point temperature will also meet the desired temperature requirements. Of course, the temperature can be the dry bulb temperature. These parameters are sufficient to result in a heat of condensation to be transmitted from the heated moist air to the food product being pasteurized.

Moisture can be applied to the pasteurization chamber 40 in different ways. For example, the moisture source can be water that is supplied by supply system 56 for hydrating the hot air within the pasteurization chamber 40. The water can be introduced within the pasteurization chamber by one or more nozzles 57 receiving water from the exterior supply source through control valve 58. The nozzle can be an atomizing nozzle which emits a stream of very small droplets of water into the atmosphere within the pasteurization chamber. Valve 58 controls the amount of water that is emitted by the nozzles. Also, a filter and water softening unit 60 and a pressure regulator 62 may be utilized in conjunction with the water supply system 56 of the pasteurization medium.

Instead of, or in addition to, water for hydrating the air within the pasteurization chamber 40, steam may be introduced into the pasteurization chamber. The steam may be from various sources, for example, from a steam generator 63. This steam generator can also be used to heat the air within the pasteurization chamber via a heat exchanger associated with air blower 52. The steam can be introduced into the pasteurization chamber by a steam inlet line 64 connected through a flow valve 66, a pressure regulator 68 and ending at one or more discharge nozzle(s) 69.

As discussed above, as the interior of the food product is heated, the moisture therein is necessarily expelled or otherwise forced out of the food product.[1] In this regard, as the food product FP travels upwardly in a helical path within pasteurization chamber 40, moisture expelled from the food product will drip downwardly, with some of the moisture falling on food product located below, but with the majority of the moisture eventually falling to the bottom of the pasteurization chamber wherein the moisture is collected in a collection reservoir 72 of a recirculation system 70. See FIG. 4. The reservoir is located at the lower portion of the pasteurization chamber 40. A heater 74 is provided within or in conjunction with the reservoir 72 to heat and/or maintain the temperature of the collected rendered juices at a sufficiently high temperature to prevent bacteria growth therein and/or kill any bacteria present in the collected rendered juices in case any cross-contamination of the rendered juices has occurred. To this end, the temperature of the collected rendered juices should be maintained at a temperature at or above 118.4° F.

[1] Approximately 70% of a meat product may be composed of water. By the time the meat product is pasteurized within the pasteurization chamber 40 and then leaves the chamber, the rendered juices from the meat product may constitute approximately 20% of the initial weight of the meat product. Thus, a significant quantity of rendered juices is collected within the reservoir 72, discussed below.

A pump 76 is provided to remove the rendered juices from the reservoir. Pump 76 may be located within the reservoir or external of the reservoir, depending on the type of pump utilized. A valve 78 directs the rendered juices up through a pipe or tube 79 and then out through a discharge nozzle 80 at the top of the conveyor stack 26. In this manner, the heated rendered juices help to heat the food products being carried upwardly along the stack 26. Rather than only discharging the heated rendered juices at the top of the stack, the juices can be applied to the stack at various elevations along the height of the stack. Of course, the rendered juices have been sufficiently heated to be free from bacteria or other pathogens prior to being applied to the food products.

In addition to, or as an alternative to, using the rendered juices to augment the heating of the food products within the oven chamber 40, the rendered juices may also be pumped to a storage unit or to another location for another purpose, such as for use in making soups, soup stock, broth, or gravy with the rendered juices. In this regard, the rendered juices from the collection reservoir 72 may be pasteurized or at least further heated in a heat exchanger 82. The heat exchanger may utilize a heating medium heated by a heater 84 prior to entering the heat exchanger 82. Heat exchangers of the nature of unit 82 are articles of commerce. As well, heaters such as heaters 74 and 84 used in the collection/recirculation system 70 are also articles of commerce.

It will be appreciated that the rendered juices along the height of the stack 26, that fall or drip downwardly or onto food products at a lower level along stack 26, will have a longer dwell time within the pasteurization chamber 40 than the food product juices that remain within the food product, and so any pathogens therein will be sufficiently heat-treated by the time such drippings exit the pasteurization chamber.

In addition to the hot, highly moisturized air within the pasteurization chamber 40 and the use of the heated rendered juices supplied by the collection and recirculation system 70, the pasteurization of the food product FP within the pasteurization chamber 40 may also be assisted by a hot liquid spray system 180. The hot liquid from the spray system 180 forms part of the pasteurization medium utilized within the oven 40. The hot liquid system 180 includes the hot liquid supply 182 that generates and/or provides hot liquid at about 131° F. to 158° F. to the interior of the pasteurization chamber 40 via inlet lines 184 and 186 to spray hot liquid on the food product being conveyed by the conveyor stack 26. The volume of the hot liquid spray may be regulated based on the measured temperature and moisture content within the pasteurization chamber as well as the speed of the moving conveyor and the speed of the air circulation through the pasteurization chamber. It is anticipated that the volume of hot liquid supplied to the pasteurization chamber may range from about 20 gallons per minute to 1500 gallons per minute. The hot temperature of the hot liquid spray is sufficient to assist in heating the food product so that it rises to a level sufficient to achieve a desired percentage kill of the pathogens on and/or in the food product during the time the food product travels through the pasteurization chamber. The hot liquid may be composed of hot water, or hot water containing various seasonings or flavorings.

Still referring to FIG. 1, freezer 100 includes an insulated freezer housing 102 configured to house conveyor belt stack 28. An intermediate conveyor run 30 interconnects the conveyor stacks 26 and 28. The intermediate run 30 enters the freezer housing 102 through an upper inlet opening 104, and the conveyor belt 22 at the bottom of the stack 30 exits the housing 102 through outlet opening 106. The freezer housing 102 may be sealed from the exterior by a standard air knife 108 associated with inlet 104 and a standard air knife 110 associated with outlet 106.

The coolant used in the freezing unit 100 may be of standard composition, for example, liquid nitrogen, which can be used to reduce the temperature of the food product entering the freezer to below 0° F. and even as low as −100° F. As a consequence, the food products are frozen solid as they travel along the conveyor stack 28, which prepares the food products for packaging, if not already packaged, and then storage and/or shipment.

Figure 2:
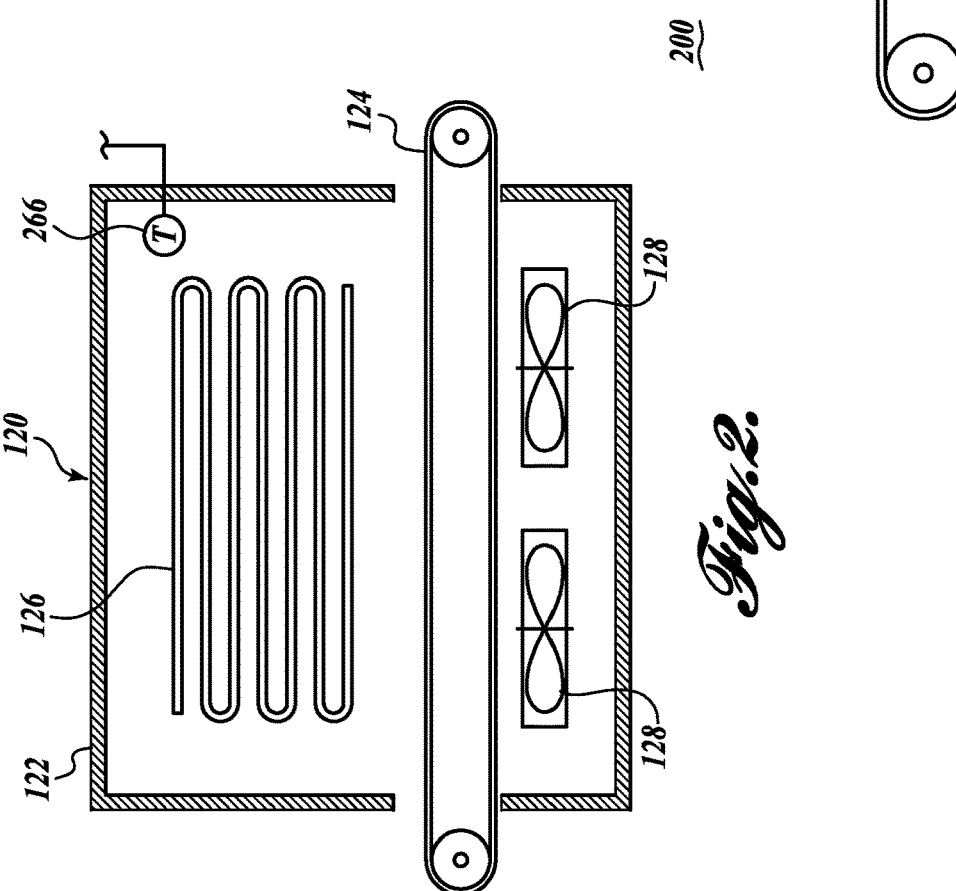
FIG. 2 is a schematic view of a pre-cooler or chiller optionally utilized with pasteurization system 10.

Rather than seeking to reduce the temperature of the food product all the way from the temperature level of the food product leaving pasteurization chamber 40 down to −100° F., such cooling may not be most effectively carried out through the use of a single freezer such as freezer 100. To this end, a pre-cooler or chiller 120, as shown in FIG. 2, may be interposed between the pasteurization chamber 40 and the freezer 100. The chiller 120 can take various forms, including chiller housing 122 and a conveyor 124 extending therethrough. A standard refrigeration assembly, labeled as 126, may be used for cooling the air within the housing 122. Also, a number of fans 128 can be used to circulate the chilled air over the food product FP as seen through the chiller 120.

One reason for using a pre-cooler or chiller, such as chiller 120, is to reduce the vapor pressure within the food product to a sufficiently low level so that the rate of frost deposition on the freezer coils of the freezing unit is reduced. In this regard, it is common to cool the food product to approximately 50° F. or cooler. The vapor from the hot food product condenses on the cooling coils of the pre-cooler or chiller 120, which is operated at approximately the freezing point, so that such liquid water does not freeze on the cooling coils and accumulate thereon.

In another form, the chiller may be composed of a cold liquid bath, which is maintained at a chilling temperature of between 34° F. and 40° F. The chilling bath will chill the food product and cause the food product to absorb both water and other flavor enhancers that may be dissolved in the cold water bath. If the food product has been packaged before the pasteurization occurs, as discussed below, then likely the cold liquid will consist of water since the liquid would not come into direct contact with the food products.

The overall purpose of the pre-cooler or chiller is to reduce the internal temperature of the food products to approximately 40° F. to 50° F., thereby to help seal in the moisture and thus the natural flavoring of the food product.

Referring back to FIG. 1, an optional pre-heater 140 may be utilized in conjunction with apparatus 10. As shown in FIG. 1, the pre-heater is located upstream of the pasteurization chamber 40. The purpose of the pre-heater can be multifold. In this regard, the pre-heater may be used to quickly elevate the temperature of the food product so that the entire temperature rise of the food product does not have to occur in the pasteurization chamber. Also, if the food product is preheated to at least 50° F., all of the ice will be melted from the food product prior to entering the pasteurization chamber 40. In addition, if the food product is preheated in the pre-heater to at least 118° F., this will be past the growth point of vegetative aerobic food pathogen cells prior to the time the food product enters the pasteurization chamber. Further, if the food product is preheated in the pre-heater to at least 125° F., such food product will be within the range of vegetative aerobic food pathogen cells time-temperature death prior to entering the pasteurization chamber. Moreover, if the exterior of the food product is preheated to the approximate desired pasteurization temperature of the food product, then the pasteurization chamber need only heat the interior of the food product to kill the desired percentage of pathogenic bacteria that may be located within the food product. In this regard, the pre-heater can be used to heat the surface temperature of the food product to at least 161° F., which will result in the elimination of aerobic vegetative pathogenic bacteria cells on the food product surface.

In addition, the preheating of the food product may enhance or improve the cosmetic appearance of the food product. For example, the preheating may include browning or otherwise darkening of the surface of the food product which can be achieved by exposing the food product to temperatures in the range of 1500° F. to 1700° F., for example, through infrared radiation. This high temperature momentarily heats the surface of the food product with minimum loss of moisture content in the food product.

In addition to infrared radiation, various other thermal energy sources may be utilized in the pre-heater, including steam, radio frequency radiation, convection, mixed liquid and gas convection, condensation, conduction, and micro-wave radiation.

Rendered juices may also be expelled from the food products being heated in pre-heater 140. Such juices can be collected in a reservoir (not shown) within or in association with the pre-heater and used for the same purposes as discussed above, regarding the juices collected in reservoir 70. In this regard, the pre-heater could have its own reservoir to collect the rendered juices or the rendered juices from the pre-heater 140 can be routed to reservoir 70 or to another location for subsequent heating, storage, and/or use.

As discussed above, the rendered juices may be collected from the food product being processed within the pasteuri-zation chamber 40. As also discussed above, such rendered juices may be used to assist in heating the food product being conveyed by the conveyor stack 26, or may be used for other purposes. One such other purpose is to apply the rendered juices to the food product in the pre-heater 140. Desirably for such use the rendered juices would be free from biological pathogens, which may require treatment/ heating of the rendered juices before application to the food product in the pre-heater 140.

Continuing to refer to FIG. 1, the pasteurization system 10 also optionally includes a post-heater 160 positioned down-stream of the pasteurization chamber 40. The post-heater 160 can be configured to overlie the conveyor belt 22, and thus also the food products FP being carried by the conveyor belt. The post-heater can be used to apply intense surface heating to the food product in order to achieve a desired color and/or flavor. To this end, the intense surface heating can be achieved by infrared radiation or other suitable heating source, typically in the range of 1500° F. to 1800° F., but can be as high as 3000° F. when using a tungsten wire in a quartz tube. Thereafter, the food product enters the freezer 10 for rapid chilling or freezing.

The desired color of the food products, if meat, may be a brown color, a dark brown color, or other color achieved by applying heat to the food product. In terms of flavor, it is known that for meat products, heat has an effect on flavor. Although the flavor of cooked meat is affected by water-soluble components, typically, the volatile compounds of the meat formed during cooking produces the aroma that con-tributes to the characteristic flavors of meat. The heating of the meat increases the concentration of aliphatic aldehydes, benzenoids, polysulfides, heterocyclic compounds, and lipid-derived volatiles. These compounds and volatiles con-tribute to the flavor of the meat. See "The Chemistry of Beef Flavor, Executive Summary," 2007 Cattlemen's Beef Board, National Cattlemen's Beef Association, Centennial, Colo. This publication is incorporated herein by reference.

The post-heater 160 can also be utilized in conjunction with the pre-cooler or chiller 120 and the freezer 100. In this regard, the pre-cooler or chiller 120 is positioned down-stream of the pasteurization chamber 40 followed by the post-heater 60 and then followed by the freezer 100. The pre-cooler/chiller 120 would be operated to rapidly chill the food product to below about 104° F., followed by applying the intense surface heating to the food product in the post-heater 160 to achieve a desired color to and/or flavor of the food product. This post-heating would be immediately followed by rapid chilling or freezing in freezer 100. In this manner, the desired color and/or flavor of the food product can be achieved without any significant further cooking of the food product. An advantage of using the foregoing procedure is to minimize moisture loss from the food product. The pre-cooler or chiller 120 will sufficiently cool the food product so that when the food product is subjected to intense post-heating, a significant depth of the food product does not reach the boiling point, which would cause the moisture therein to be forced out of the food product. In essence, use of the pre-chiller reduces the depth of the food product that reaches the boiling point during post-heating.

Next, referring to FIG. 3, the pasteurization system 10 may also include an optional marinator 200. The marinator 200 functions to inject a marinade or other liquid(s) into the food product while being transported either along conveyor belt 22 or a separate conveyor belt section 202. Marinator 200 is illustrated as utilizing a series of injection needles 204 that may be plunged downwardly by or from an overhead mounting and/or control system 206 positioned above the conveyor belt section 202. The needles are capable of quickly injecting marinade into the food product FP.

The marinade can be of various compositions, for example, a solution of water, sugar, salt and/or phosphates to flavor and help maintain the moistness of the food product during pasteurization. Other marinating solutions that may be utilized include, for example, fruit juices, cooking oils, dissolved flavorings and spices, etc.

Also, rather than marinating via injection needles 204, food product may be passed through an immersion bath containing a desired marinating solution. Such immersion bath may be used in lieu of or in addition to injecting the marinade into the interior of the food product using a system as shown in FIG. 3 or other system. Further, the marinade may be sprayed, brushed, or otherwise applied to the exte-rior of the food product prior to entering the pasteurization chamber 40. Such exterior application of the marinade can be in lieu of or in addition to the injection of the marinade into the interior of the food product.

Next, referring to FIG. 5, it is contemplated that the food product may be packaged at packaging station 230 prior to being pasteurized in the pasteurizing oven 40. The packag-ing of the food product is schematically illustrated in FIG. 5. If a pre-heater such as pre-heater 140 is utilized, likely the packaging station 230 would be disposed upstream of pre-heater 140. As shown in FIG. 5, the food product is sealed and pasteurized within sterile pouches or packages 232. Such packages can be formed from a lower sheet 234 overlying conveyor belt 22 and thereby overlying the lower sheet with an upper sheet of thermoplastic film 238. The pocket or pouch 232 can be formed by applying a vacuum to the lower sheet, thereby drawing the lower sheet and the food product thereon into a tray or mold, not shown, as the food product moves on the conveyor 22 in the direction of arrow 240. The pockets 232 formed in the lower sheet 236 conform to the size and shape of the food product. After the food products have been placed in the pockets formed in a lower sheet of film, the upper sheet of thermoplastic film 238 is placed over the lower sheet. The upper sheet is fed from a supply roll 242 downwardly over the top of the lower sheet and then sealed against the lower sheet with a vacuum and heat seal system to form sterile sealed pouches or packages 232. Such packages can be cut from the sealed sheets of thermoplastic film 236 and 238 along cut lines 244 thereby to separate the pouches 232 from one another.

The thermoplastic film of sheets 236 and 238 are well known articles of commerce. Such sheets can be composed of polyethylene or other thermoplastic material.

The packaging of the food product FP can occur by numerous other ways in addition to that shown in FIG. 5.

In situations in which the food product is packaged, the pasteurization medium utilized to pasteurize such food product would rely primarily on hot liquid system 180 to apply the heated liquid over the packaged food product as the food product is being conveyed by conveying system 20 to achieve a suitable temperature treatment over a suitable period of time. To assist in the pasteurization process, the recirculation system 70 could be used to recirculate the hot liquid that collects at the bottom of the pasteurization chamber 40. Since the food product is sealed within pouches 232, likely the hot liquid would be composed of water.

As noted above, the pasteurization system 10 includes a monitoring system 252 that monitors or measures the operational parameters of the pasteurization system 10. Such monitoring or measuring includes the loading frequency or density of the food product loaded onto the conveyor 20 from the delivery conveyor 24. Such loading monitor or sensor is schematically symbolized by the loading monitor/sensor 254 shown in FIG. 1. The loading monitor/sensor can take various forms, including a scale to weigh the food product being transferred to conveyor 20. Alternatively, the loading monitor can be in the form of an optical scanner capable of scanning the food product and determining the volume of the food product, then calculating the weight of the food product by using the known density of the food product. Such scanning systems are well known in the art. For example, see U.S. Pat. No. 7,452,466. The disclosure of this patent is incorporated herein by reference. The information from the load monitor 254 is transmitted to the control system 250.

The monitoring system 252 also measures the temperature and moisture level within the heating chamber 40 as well as the velocity of the air flowing through the pasteurization chamber. These operational parameters are monitored by temperature sensor 256, moisture sensor 258, and velocity sensor 260 as shown in FIG. 1. These sensors are connected to the control system 250. The temperature sensor 256 is preferably configured to sense the dry bulb and wet bulb temperatures within the pasteurization chamber 40. The reason for also measuring the wet bulb temperature is that as the food product is carried through the pasteurization chamber 40, its surface temperature gradually increases. Eventually this surface temperature will reach the dew point temperature of the moist, hot air in the pasteurization chamber 40. At that point, the moisture in the pasteurization medium within the chamber 40 will not condense on the surface of the food products. Instead, the moisture on the surface of the food products will begin to evaporate, which tends to cool the food product somewhat. The temperature at which this transition occurs will be the wet bulb temperature. Nonetheless, the temperature of the food product must still be sufficient to kill the desired level of pathogens on and/or in the food product. As an alternative, the monitoring system can measure the dry bulb temperature and humidity level in the heating chamber 40. From this information it is possible to determine the wet bulb temperature, relative humidity, and dew point within the chamber 40.

The monitoring system 252 can utilize temperature sensors to continuously measure the temperature of the food product when within the pasteurization chamber 40. As discussed below, this could simplify or perhaps even eliminate modeling of heat transfer, but of course modeling of the lethality of pathogens occurring in the pasteurization chamber 40 would still be required.

The temperature of the collected rendered juices within collection tank 72 is measured by temperature sensor 262, which is also connected to the control system 250. The monitoring/measuring system 252 also measures the temperature within the freezer 100 utilizing temperature sensor 264 located within the freezer. In addition, a temperature sensor 266 is located within the pre-chiller 120 shown in FIG. 4. This temperature sensor is also connected to the controller 250.

The monitoring/measuring system 252 can be configured to also measure the initial temperature of the food product, such as by use of a temperature sensor 268 located just upstream of the pre-heater 140. Temperature sensor 268 can be an infrared sensor or may be of another type. Also, the temperature of the food product FP may be sensed at other locations along the pasteurization system.

As noted above, pasteurization system 10 includes a control system to help insure that the food product is pasteurized sufficiently to kill a desired percentage of the pathogenic microorganisms present on and/or in the food product. To this end, the various sensors and measurement devices and instrumentation discussed above are connected to the control system 250 by hard wiring, radio frequency, or other wireless transmission means, or otherwise so that the control system is aware of the loading level of food product on the conveyor 20, the speed of the conveyor 20, the temperature and moisture within the pasteurization chamber, as well as the direction and velocity of the hot air blowing across the food product in the pasteurization chamber, the temperature of the collected rendered juices within the collection reservoir 72, the temperature within the freezer 100, as well as the temperature within the pre-cooler or chiller 120. The control system 250 monitors these operational parameters of the system 10 to determine if such operational parameters are within the set points that have been predetermined for these operational parameters. When the operational parameters are within the set points, it has been predetermined that the processing of the food product by system 10 will kill a desired percentage of pathogenic microorganisms present on and/or in the food product in question.

The control system 250 includes a processor 300 for use in controlling the pasteurization system 10. The control system also includes a suitable controller 302, such as a programmable logic controller 302 linked to the processor and having an appropriate interface 304 for connecting the various gauges, monitors, and components of the pasteurization system to the logic controller 302. Memory unit 306 is provided for storing information regarding the pasteurization system, and a keyboard or other input device 308 is provided to enable the operator to communicate with the processor and logic controller. Also, a display or other output device 310 is provided to convey information from the processor or control system to the operator, including the functioning of the pasteurization system 10. An example of a processor-operated control system for controlling a pasteurization apparatus is disclosed by U.S. Pat. No. 6,410, 066, which is incorporated herein by reference.

The control system, more specifically the computer together with the controller 302, controls the various components and subsystems of pasteurization system 10, including the level of the loading of the food product onto the conveyor, by controlling the operation of the loading conveyor 24. The control system also controls the speed of the conveyor 22 by controlling the conveyor drive motor 30. In addition, the control system controls the temperature within the pasteurization chamber 40 by controlling the temperature, volume, and speed of the hot air circulated through the pasteurization chamber 40. The control system also controls the operation of heater 74 used to heat the collected rendered juices as well as the pump 76 used to recirculate such heated rendered juices to the conveyor stack 26 within the pasteurization chamber 40. Further, the control system controls the operation and supply of the hot liquid that is applied to the food product being conveyed on the conveyor stack 26. The control system also controls the operation of the freezer 100 as well as the pre-chiller/cooler 120. In addition, the control system controls the operation of the pre-heater 140 and post-heater 160. The control system also monitors the loading sensor 254, the moisture sensor 258, the circulation or velocity sensor 260, as well as the various temperature sensors 256, 262, 264, 266, and 268. Thus, the control system is capable of controlling the pasteurization system 10 and the pasteurization process performed by the pasteurization system to achieve a targeted reduction in the pathogenic microorganisms present on and/or in the food product FP.

In the control system 250, the computer 300 may operate under a process control program to control the pasteurization process in accordance with, for example, the specific temperature and humidity profile within the pasteurization chamber 40 which was determined empirically to achieve a desired microbial kill rate within a fixed period of time for a specific food product. The process control program may be designed to predict the temperature of the food product as it changes over time and applies a time/temperature model. This model is not just the kill rate of the bacteria, but also a prediction of the temperature of the food. The models used will have been validated and confirmed to meet applicable food health and safety regulations, for example, the FDA's Hazard Analysis and Critical Control Points (HACCP) plans and principles, as well as USDA regulations. Of course, the validated model used herein will have to be specific to: the type of food product; the thickness range of the food product; the initial temperature of the food product; in some instances, the fat content of the food product; the moisture content of the food product; the temperature of the pasteurization medium and/or the pasteurization zone; the moisture level of the pasteurization medium and/or pasteurization zones; the loading level of the food product on the conveyance system; etc. Also, the validation modes will have to include assumptions about the food product, for example, heat transfer coefficients, mass transfer out of the food product, and weight of the food as pasteurized, etc. Due to the inherent variability of food products, the temperature prediction will have a certain range, and a conservative approach will have to be taken, for example, a sufficiently long pasteurizing time or a sufficiently high pasteurizing temperature to compensate for the uncertainty. The approach may include a statistic analysis to determine pathogen kill based on the food product variables noted above, including, for example, thickness of the food product, fat content, and other composition of the food product, the initial temperature of the food product. As a consequence, some individual food products will require a longer pasteurizing time than other specific food products. The statistic approach can be taken to determine the desired pathogen kill of the least heated food product.

In addition, the control system may operate under a process deviation program that includes a real-time mathematical model that calculates the time and temperature required to achieve a desired kill rate and undertakes process parameter changes if, for example, the temperature and/or humidity of the air within the pasteurization chamber deviates sufficiently from the set point range(s). The control program may utilize one or more proportional-integral-derivative (PID) controller algorithms which function to adjust one or more of the system parameters to seek to enable the system to still achieve a desired microbial kill rate, even if one or more of the operational parameters of pasteurization system are beyond their preselected set point (s). For example, if the monitoring system 252 indicates that the temperature within the pasteurization chamber 40 deviates too far from the set point, the control system 250 can not only seek to bring the temperature of the pasteurization chamber back to within the desired set point, but also could immediately decrease the speed of the conveyor so that the food product dwell time in the pasteurization chamber is increased. Also, the amount of hot liquid spray from the hot liquid system 180 applied to the food products within the pasteurization chamber 40 can be increased; as well, the flow of recirculated rendering moisture from the collection tank 72 can be increased. Moreover, if a post-heater 160 is utilized, the control system 250 can alter the operation of the post-heater in an effort to achieve a desired microbial kill rate in the food product.

Moreover, if the control system 250 determines that the food product leaving the pasteurization chamber 40 has not been properly pasteurized, the control system could automatically activate a diverter system, not shown, to divert the affected food products from the conveyance system 20 so that such food products can be reprocessed to achieve the desired microbial kill rate or used for another purpose.

Rather than automatically adjusting the operational parameters of the pasteurization system 10, the control system 250 may instead alert the operators to the deviation of the affected process parameter from the preset set point. The control system can, in addition, suggest adjustments to be made to the process parameters and/or operational settings of the components of the pasteurization system. Thereupon, the operator can make the indicated adjustments.

The control system 250 also may include a program that records the ongoing pasteurization system for future review and reference. Such a recordation program, as well as process control programs and process deviation programs, are disclosed in U.S. Pat. No. 6,410,066, incorporated herein by reference.

A process control program under which the controller system 250 operates may be designed to start the pasteurization system 10 as well as thereafter control the pasteurization system in order to maintain the process parameters at or near their predefined set points during the operation of the system 10. When starting the pasteurization system 10, the user can prompt the control system, whereupon the control system will activate the conveyance system 20 so that the conveyor belt 22 operates at its predefined speed. The control system will also activate the hot air pump 52 to raise the temperature in the pasteurization chamber 40 to its predesigned set point. When the temperature within the pasteurization chamber reaches the selected set point, as determined by the temperature sensor 256, the control system can activate the water supply system 56 and/or the steam generator 63 used to supply water and/or steam to the pasteurization chamber via steam inlet line 64 thereby to increase the moisture level of the pasteurization medium within the pasteurization chamber. When the moisture level within the pasteurization chamber reaches the set point as determined by the humidity sensor 258, the computer can activate the infeed conveyor 24 in order to begin pasteurization of food products.

The control system may prompt the operator to enter the type and initial temperature of the food product to be processed and also request other information concerning the food product, as listed above. Alternatively, the control system may simply measure the initial temperature of the food product using temperature sensor 268. As the pasteurization process proceeds, the control system will monitor the process conditions of the pasteurization system 10, and if necessary, adjust the various components of the pasteurization system, such as the loading level of the food product onto the conveyor, the speed of the conveyor, the temperature and volume flow rate of the hot air in the pasteurization chamber, the moisture level within the pasteurization chamber, the temperature and amount of collected rendered juices applied to the food product, as well as the temperature and amount of hot liquid applied to the food product from supply system 182 in order to maintain the process conditions within the preselected set point ranges.

FIG. 5 demonstrates a control program that may be operated by control system 250 to control the pasteurization system 10. In essence, the control program depicted in FIG. 5 combines a process control program as described with a process deviation program that adjusts certain components of the pasteurization system 10 when the control system 250 detects certain deviations between the process conditions or parameters and their set point values.

As shown in FIG. 5, the operator of system 10 first selects the type of food product that will be pasteurized, such as, for example, beef patties (step 350). Based on this particular food product, the control system operates the infeed conveyor 24 to affect the desired loading of the beef patties on the conveyor belt 22 (step 352). In addition, the control system activates certain of the other components of pasteurization system 10, including the hot air pump 52, the water supply system 56, the steam supply system 63, the hot water supply system 182, and the rendered juice recirculation system 70, thereby to achieve the predetermined process conditions within the pasteurization chamber 40 (step 354). As part of this step, the operation and control of the process parameters is recorded.

The control system then obtains the initial temperature of the beef patties, either from the operator or from direct measurement using temperature sensor 268 (step 356). Using well known pasteurization equations, the control system calculates the conveyor speed which is needed to achieve a target microbial kill rate, for example, a 5-log reduction in the pathogenic organisms that may be on and/or in the food product (step 358). If required, the control system adjusts the belt speed, senses the process conditions in the pasteurization chamber 40, and adjusts the components of the pasteurization system to be consistent with their set points. As noted above, these components could include the hot air pump 52, the moisture supply system 56, the steam supply system 63, the hot liquid supply system 182, as well as the collected rendered liquid recirculation system 70 (step 360).

In step 362, the control system compares certain of the process conditions determined in step 360, such as the temperature and moisture level of the air within the pasteurization chamber 40, with the corresponding set point values and determines if a deviation exists in these values. If no deviation exists or if the deviation is within preselected limits, the control system will continue to operate the pasteurization system 10 in the normal fashion by cycling back to step 354. However, if a deviation exists that extends beyond a preselected limit, the control system will adjust the speed of the conveyor belt 22 in a predetermined fashion in an attempt to achieve the target microbial kill rate (step 364). The control system will thereafter sense the process conditions at step 366 and compare the sensed values to their predetermined set points to determine if the deviation has been cleared (step 368). If the deviation has been cleared, the computer will continue to operate the pasteurization system 10 in a normal fashion by cycling back to step 356.

If the deviation has not been cleared, either the operator or the control system will decide whether the quality of the beef patties has been adversely affected, for example, that the desired microbial kill rate achieved is not within acceptable standards (step 370). If the quality of the beef patties has been sufficiently adversely affected, the beef patties will be isolated (step 372). If, however, the quality of the beef patties has not been affected, the control system will return to step 364 and once again adjust the speed of conveyor belt 22 in a predetermined fashion in an attempt to achieve the target microbial kill rate.

Although specific embodiments of the present disclosure have been described above, such embodiments are not intended to be exhaustive nor is the present disclosure to be limited to the specific embodiments described. The present invention can take other forms. For example, rather than utilizing a control system 250 that automatically seeks to adjust process parameters in order to attain a desired microbial kill level by utilizing the process deviation program that includes a real-time mathematical model that calculates the time and temperature required to achieve a desired kill rate, alternative or simpler processes may be utilized. For example, it is possible to utilize simplified formulas or look-up tables that will provide the microbial kill rate depending on the deviation of the process parameter in question, for example, the temperature within the pasteurization chamber. The look-up table could specify the dwell time needed within the pasteurization chamber for an acceptable kill rate to be achieved at specific temperatures within the pasteurization chamber. Use of one or more simplified formulas or look-up tables may be especially useful if the control system is of the type that provides notices of process deviations to the operator and then requires the operator to determine what corrective action, if any, is needed.

Another simplified approach is to simply increase the dwell time of the food product in the pasteurization chamber to account for variations in the temperature of the food product entering the pasteurization chamber and the temperature and humidity within the pasteurization chamber. For example, if based on the temperature of the food product entering the pasteurization chamber and/or the temperature and/or humidity within the pasteurization chamber the ideal dwell time is 40 minutes, then the dwell time within the pasteurization chamber might be increased to 50 minutes to accommodate tolerances in the initial temperature of the food product as well as the temperature and/or humidity within the pasteurization chamber. In this regard, dwell time has less impact on food product quality than if instead the temperature within the pasteurization chamber were to be increased significantly. On the other hand, an increased dwell time within the pasteurization chamber does have a negative effect on food product throughput, so it is desirable to not increase dwell time beyond that necessary to ensure product safety.

Increasing the dwell time to ensure a desired kill rate can work well, especially if the food product is pre-heated to the desired pasteurization temperature and then maintained at a constant temperature and humidity atmosphere in the pasteurization chamber. In this regard, the temperature of the food product could simply be periodically measured upon exit from the pasteurization chamber. Based on the measured temperature of the exiting food product, the dwell time of the food product within the pasteurization chamber could be conveniently adjusted. As can be appreciated, this can be a rather straightforward approach to achieving the desired kill rate of biological pathogens in food products.

Another approach is to measure the temperature of the food product continuously, or relatively continuously, during pasteurizing, and that temperature is used in the time/temperature lethality calculation. An actual model may not be needed to be used to predict temperature of the food product, although the temperature has to be representative of the worst case in the oven at any given time. In this approach, it would not necessarily be practical to continuously measure the temperature of each food product. Rather, the temperature of selective food products would be continuously measured, since at least a portion of such measuring will or may need to be performed manually. The number of food products actually measured for temperature could be selected on a statistical basis so that a desired confidence level is achieved regarding the accuracy of the measured temperature of the food product.

As another variation or aspect of the present disclosure, the pasteurization chamber 40 can be divided into two or more temperature and humidity zones. For example, the pasteurization chamber may be maintained at a higher temperature as well as perhaps a higher humidity toward the bottom of the stack 26. This can be achieved, for example, by introducing either hotter air and/or a higher volume of heated air in the lower portion of the stack 26. Also, the temperature of the hot liquid from supply 182 applied to the food product in the lower section of the stack 26 may be at a higher temperature than the temperature of the hot liquid applied to the upper portion of the stack 26. Also, separate moisture and/or steam inlets may be positioned in the lower portion of the stack 26. Further, in order to help physically separate the stack 26 into different temperature and/or humidity zones, a partition 350 may extend inwardly from the walls of the housing 42 to provide at least partial physical separation between the upper and lower portion of the stack 26. Applying higher temperature and/or humidity in the lower portion of stack 26 has the advantage of more quickly warming up the food product to a temperature that is above the killing temperature of pathogenic microorganisms; in other words, above 125.6° F.

As a further aspect to the present disclosure, the pasteurization system 10 can be operated to achieve various degrees of cooking of the food product so that the amount of cooking required by a restaurant, consumer, etc., may be the same, regardless of whether the consumer desires the food product to be cooked to, for example, a medium rare, medium, medium well, or well done condition for consuming. As such, the final cooking step may be essentially the same for any desired "degree of doneness," such as medium rare, medium, medium well, or well done. Process parameters can be calculated/developed so that the required amount of cooking of the food product can be essentially the same using the system 10 of the present disclosure. The parameters such as the temperature within the pasteurization chamber 40 as well as the speed of the conveyor belt 22 may be adjusted to achieve the desired level of cooking of the food product. For example, to achieve a medium rare level of cooked food product consisting of beef patties, the temperature within the pasteurization chamber may be from about 135° F. to about 140° F. To achieve cooking of the beef patties to a medium done condition, the temperature within the pasteurization chamber may be from about 140° F. to about 145° F. Correspondingly, to achieve a medium well cooked condition of the beef patties, the temperature within the pasteurization chamber may be from about 145° F. to about 150° F. Further, to achieve cooking of the beef patties to a well done condition, the temperature within the pasteurization chamber may be from about 150° F. to about 160° F. Cooking under these last conditions will achieve a "well done" color of the beef patties as well as high level of food safety.

Various desirable/acceptable cooking temperatures are set forth above. As noted, these temperatures specifically pertain to the cooking/pasteurization of beef or beef patties. Of course, if other types of meat, such as lamb, pork, chicken, turkey, fish and/or other types of food products are being processed, the pasteurizing temperatures set forth herein may need to be adjusted accordingly.

While illustrative embodiments have been illustrated and described, it will be appreciated that various changes can be made therein without departing from the spirit and scope of the invention.

The embodiments of the invention in which an exclusive property or privilege is claimed are defined as follows:

1. A time-temperature method for continuously pasteurizing food products in a heating chamber, the method comprising:

(a) subjecting the food product comprising a first food product and a second food product to a singular pasteurization step in a heating chamber, the heating chamber comprising an airborne pasteurization medium, wherein:

the food product is selected from the group consisting of beef, pork, lamb, fish, chicken, turkey, eggs, and combinations thereof, the first food product enters the heating chamber before the second food product, a set point chamber temperature of the airborne pasteurization medium is greater than a kill temperature of 125.6° F., wherein the set point chamber temperature comprises a first dry bulb temperature and a first wet bulb temperature, the set point chamber temperature does not exceed 158° F., the first food product contacts the airborne pasteurization medium at a first operational chamber temperature set to the set point chamber temperature for a first pasteurization time of about 55 minutes or less that is sufficient to kill bacteria on and in the first food product, the first pasteurization time is sufficient such that a first internal maximum temperature of the first food product does not exceed a fat rendering temperature when the food product contacts the airborne pasteurization medium for the first pasteurization time and at the set point chamber temperature, the fat rendering temperature is about 151° F. when the food product is beef, pork, or lamb, about 140° F. when the food product is fish, about 149° F. when the food product is chicken or turkey, and about 153° F. when the food product is eggs;

(b) conveying the first food product loaded on a continuous spiral conveyor within the heating chamber during the singular pasteurization step at a first conveyor speed sufficient to retain the first food product in the heating chamber for the first pasteurization time;

(c) discharging heated air into the heating chamber in a horizontal and downward direction over the food product and restricting an upward return flow of heated air below 400 feet per minute, thereby generating controlled circulation of the airborne pasteurization medium;

(d) monitoring:

a first initial temperature of the first food product at a point upstream of the heating chamber prior to conveying the first food product within the heating chamber;

the first operational chamber temperature;

a first food temperature of the first food product within the heating chamber;

the first conveyor speed within the heating chamber; and a second initial temperature of the second food product at a point upstream of the heating chamber prior to conveying the second food product within the heating chamber;

(e) modelling a lethality of pathogenic microorganisms on and in the second food product based on:

the first food temperature;

the first conveyor speed; and the first operational chamber temperature, wherein the modelling comprises determining if the first conveyor speed and the first operational chamber temperature are sufficient for the second food product to attain a second internal maximum temperature that is sufficient to kill bacteria on and in the second food product but to not exceed the fat rendering temperature; and (f) based on the modelling, initiating a rectifying procedure when the second food product is subject to the singular pasteurization step in the heating chamber to make real-time adjustments if:

(i) the first operational chamber temperature does not attain the set point chamber temperature for a second pasteurization time sufficient for the second food product to reach a desired level of lethality of pathogenic microorganisms on or in the food product;

(ii) a modelled second internal temperature of the second food product does not attain the kill temperature for the second pasteurization time; or (iii) a second conveyor speed deviates sufficiently from the first conveyor speed so that sufficient pathogenic microorganisms on and in the second food product are not killed so as to achieve pasteurization of the second food product.

2. The time-temperature pasteurization method of claim 1, further comprising chilling or freezing the food product after the food product is subjected to pasteurization.

3. The time-temperature pasteurization method of claim 2, further comprising prior to freezing the food product:

chilling the food product to a surface temperature below 104° F.; and applying heat to the surface of the food product sufficient to achieve a desired color and/or flavor.

4. The time-temperature pasteurization method of claim 1, further comprising preheating the food product before pasteurizing the food product using one or more of the following heat energy sources: steam, radio frequency radiation, infrared radiation, convection, mixed liquid and gas convection, condensation, conduction, and microwave radiation.

5. The time-temperature pasteurization method of claim 1, further comprising a step of applying surface heat to the food product sufficient to achieve a desired color and/or flavor either before pasteurizing the food product or after pasteurizing the food product and before the food product is chilled or frozen.

6. The time-temperature pasteurization method according to claim 1, further comprising collecting a water-based liquid exuded from the food product during the pasteurization of the food product, and heating the water-based liquid to a temperature of at least 118.4° F. before applying the collected rendered water-based liquid to the food product to assist in heating the food product interior to a desired temperature set point of between 131° F. and 158° F.

7. The time-temperature pasteurization method of claim 1, wherein the rectifying procedure comprises altering a conveyor speed within the heating chamber and one or more of the following:

altering a temperature within the heating chamber;

altering a moisture level within the heating chamber;

altering an air circulation speed within the heating chamber;

altering a food product interior temperature prior to entering the heating chamber;

altering a loading level of the food products onto the conveyor; and diverting a food product from the conveyor.

8. The time-temperature pasteurization method of claim 1, wherein the first internal maximum temperature of the first food product is 140° F.

9. The time-temperature pasteurization method of claim 1, wherein a set point temperature of the interior of the food product is from 125.6° F. to the fat rendering temperature.

10. The time-temperature pasteurization method of claim 1, further comprising supplying moisture to the food product during pasteurization to provide a moisture level during pasteurization of 80% to 100% relative humidity.

11. The time-temperature pasteurization method of claim 10, wherein moisture is supplied by water emitted from nozzles or by steam.

12. The time-temperature pasteurization method of claim 1, further comprising: measuring a loading level of food products on the conveyor and utilizing the loading level of the food product on the conveyor in modeling the lethality of the microorganisms on or in the food product.

13. The time temperature pasteurization method of claim 1, wherein the heating chamber comprises a first zone comprising a first zone temperature and a first zone humidity and a second zone comprising a second zone temperature lower than the first zone temperature and a second zone humidity lower than the first zone humidity, such that the singular pasteurization step comprises the food product being conveyed through the first zone before the second zone.

14. The time temperature pasteurization method of claim 1, wherein the set point temperature in the heating chamber is about 138° F. and the first pasteurization time is about 55 minutes.

15. The time temperature pasteurization method of claim 1, further comprising one or more of the following steps:

subjecting the food product to a pre-heating step in a pre-heater prior to the food product entering the heating chamber, wherein the food product is preheated in the pre-heater to at least 50° F.; and subjecting the food product to a post-heating step in a post-heater after the food product has exited the heating chamber, wherein the post-heater applies infrared radiation at a temperature sufficient to achieve a desired color and flavor.

16. The time temperature pasteurization method of claim 1, wherein, in the rectifying procedure, the first operational chamber temperature within the heating chamber and the first conveyor speed are both adjusted to the second operational chamber temperature and the second conveyor speed based on the modelling.

17. A time-temperature method for continuously pasteurizing a food product consisting of meat, fish and poultry in a heating chamber at a predetermined maximum temperature within the heating chamber that does not exceed 158° F. over a sufficient time duration to kill the pathogens located on and/or in the food product to pasteurize the food product, the method comprising:

(a) conveying the food product loaded on a continuous spiral conveyor at a conveyor speed within a heating chamber during the pasteurizing of the food product, the food product comprising a first food product and a second food product;

(b) during conveying of the food product within the heating chamber, subjecting the food product to an airborne pasteurization medium at a temperature in the heating apparatus wherein the pasteurization medium does not exceed 158° F. during the entirety of the pasteurizing method by limiting the heating of the interior of the food products during the pasteurizing process to a temperature that does not exceed a fat rendering temperature that renders fats of the food product, the fat rendering temperature being about 151° F. when the food product is beef, pork, or lamb, about 140° F. when the food product is fish, about 149° F. when the food product is chicken or turkey, and about 153° F. when the food product is eggs, and the airborne pasteurization medium comprising heated air discharged into the heating chamber in a horizontal and downward direction over the food product and restricting an upward return flow of heated air below 400 feet per minute, thereby generating controlled circulation of the airborne pasteurization medium;

(c) measuring the temperature of the first food product interior or exterior and the second food product interior or exterior when loaded on the conveyor;

(d) controlling the operation of the conveyor so that the food product remains within the heating chamber for a duration of about 55 minutes or less and that is sufficient to pasteurize the food product;

(e) monitoring the speed of the conveyor within the heating chamber, an operational measured temperature comprising the dry bulb temperature and the wet bulb temperature, and at least one of: the measured temperature of the food product interior or exterior and the duration of the conveying within the heating chamber during the pasteurization process;

(f) modelling a lethality of pathogenic microorganisms on and in the second food product based on the first food temperature, the speed of the conveyor, and the operational measured temperature to determine if the second food product will attain a temperature of above the temperature needed to kill bacteria for a sufficient length of time needed to reach a desired level of lethality of pathogenic microorganisms on and in the second food product;

(g) if based on the modeled lethality of the pathogenic microorganisms, pasteurization of the second food product is not achieved, initiating a rectifying procedure to kill the necessary level of pathogens on and/or in the second food product to pasteurize the second food product; and (h) wherein during the rectifying procedure, the speed of the conveyor is adjusted, and the temperature within the heating chamber does not exceed 158° F.

18. The time-temperature pasteurization method of claim 17, wherein the pasteurization of the food product is carried out at a moisture level of about 80% to about 100% humidity.

19. The time-temperature pasteurization method of claim 17, wherein the rectifying procedure comprises altering the conveyor speed within the heating chamber, and one or more of the following:

altering a temperature within the heating chamber;

altering a moisture level within the heating chamber;

altering an air circulation speed within the heating chamber;

altering a food product interior or exterior temperature prior to entering the heating chamber;

altering a loading level of the food products onto the conveyor; and diverting a food product from the conveyor.

\* \* \* \* \*